Aug. 19, 1969   M. GARFINKLE   3,461,688

CONSTANT VELOCITY UNIVERSAL JOINT

Filed Nov. 9, 1967

INVENTOR.
MARVIN GARFINKLE

BY

ATTORNEY

United States Patent Office 3,461,688
Patented Aug. 19, 1969

3,461,688
CONSTANT VELOCITY UNIVERSAL JOINT
Marvin Garfinkle, P.O. Box 4704, Fairview Park,
Cleveland, Ohio 44126
Filed Nov. 9, 1967, Ser. No. 681,793
Int. Cl. F16d 3/33, 3/16
U.S. Cl. 64—21
9 Claims

ABSTRACT OF THE DISCLOSURE

A constant velocity universal joint having a driving shaft and a driven shaft each forming a yoke at their adjacent ends. An annular coupler is trunnioned to one yoke and encircles the other yoke. A second coupler is trunnioned to the second yoke and arranged within and trunnioned to the annular coupler. Relative rotation between the parts is facilitated by pins, which are preferably roller bearing mounted. An elastic restraining element confines the shafts within the proper working relationship.

---

The invention relates generally to universal joints and, more particularly, to a constant velocity joint in which the driving and the driven shafts are connected by a two member torque-transmitting element trunnioned about three axes of rotation.

The device conventionally used to transmit power between intersecting shafts whose angle relative to each other varies is a common cross-pin universal joint, first described by Cardan and developed by Hooke. One disadvantage of such a mechanism is that at any specific joint angle the output shaft does not turn with the same constant velocity of the input shaft, but instead leads and then lags behind the input shaft. For each complete revolution of a Cardan-Hooke joint there are two positions 180 degrees apart during which the driven shaft has advanced relative to the driving shaft and two positions 90 degrees to the advanced positions during which the driven shaft lags behind the driving shaft. At high speeds and heavy loads, this torsional pulsation is a source of vibration and wear that can be detrimental and even destructive to driven machinery. The amplitude of the torsional pulsations increases with increasing joint angle.

Constant velocity universal joints were eventually developed which overcame the limiting characteristics of the Cardan-Hooke joint. Virtually all universal joints, whether constant velocity or not, are comprised of a driving-shaft member, a driven-shaft member, and an intermediate assembly which transmits torque between the shaft members. For constant velocity operation, the torque-transmitting elements of the intermediate assembly must, for all rotational positions of the joint, lie either in the homokinetic plane, which is the plane normal to the plane containing the shafts and that bisects the angle between the shafts, or be symmetrically positioned about the homokinetic plane. The torque-transmitting cross-pins or trunnions of the intermediate assembly of the Cardan-Hooke joint cannot be symmetrically positioned in relation to the homokinetic plane, and in only four positions during one complete revolution of the joint do either one lie in the homokinetic plane.

The constant velocity universal joints presently in common use have shaft members that contain intricate raceways and must of necessity be precision engineered. The torque-transmitting elements of the intermediate assembly are a series of circumferentially positioned bearing balls which, through various systems of restraints, lie in the homokinetic plane for all joint angles and rotational positions. These joints suffer from a high degree of complexity compared to the Cardan-Hooke joint, and require a far greater degree of precision in manufacturing resulting in a corresponding increase in cost.

Other known constant velocity universal joints employ numerous and complex torque-transmitting elements and restraining devices in order to obviate the need for bearing races with balls disposed therebetween.

The disadvantage of the prior art devices are avoided by the present invention which embodies the simplicity of a Cardan-Hooke joint but having the inherent advantages of a constant velocity joint.

More specifically, an aspect of the present invention resides in the provision of a universal joint of the type above described having a two member intermediate assembly connecting the yokes of the driving and driven shaft. An annular coupler is trunnioned to one yoke and encircles the other. The second intermediate member is an elongated bar coupler trunnioned to the second mentioned yoke and arranged within and trunnioned to the annular coupler. The intermediate members, or couplers, are constructed and arranged in such a manner in relation to the yokes so that each of the trunnions is maintained in symmetry with the homokinetic plane.

It is therefore the primary object of the present invention to provide a more simplified constant velocity universal joint.

It is a more specific object of the invention to provide a device of the type mentioned above which obviates the need for complex ball bearings and raceways therefor, or equally complex substitutes.

It is a further object of this invention to provide a constant velocity universal joint with increased rolling contact surface between the torque-transmitting members which may be used entirely without roller bearings depending upon the deployment of the device, or with standard roller bearings.

For a better understanding of the present invention, together with other and further objects thereof, reference is had to the following description taken in connection with the accompanying drawings, and their scope will be pointed out in the appended claims.

Figure 1:
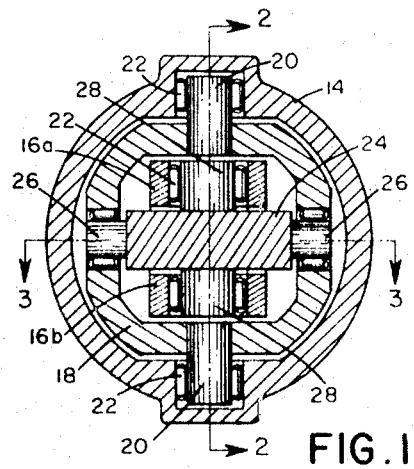
FIGURE 1 is a transverse cross-sectional taken along line 1—1 of FIGURE 2 of a universal joint in accordance with this invention.
Figure 2:
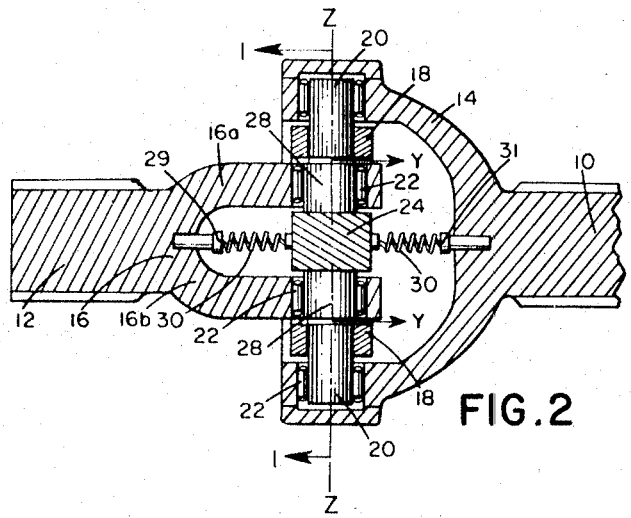
FIGURE 2 shows a longitudinal cross section taken along line 2—2 of FIGURE 1.
Figure 3:
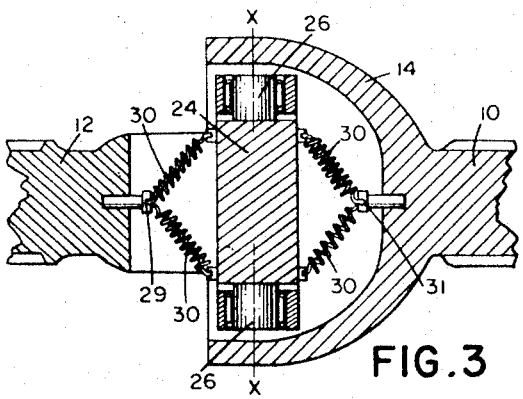
FIGURE 3 is a view similar to FIGURE 2 but taken along line 3—3 of FIGURE 1.

Referring now to the drawings FIGURES 1 to 3, there are shown shafts 10 and 12 one of which is a driving shaft and the other a driven shaft, both of which are to be connected by a universal joint. The shaft 10 has a bell-shaped end 14 which for simplicity is hereinafter, particularly in the claims, also referred to as a yoke. The adjacent end of shaft 12 consists of a yoke 16 having two, parallel, prongs 16a, 16b which protrude into the bell-shaped end 14.

The intermediate assembly connecting the aforesaid yokes 14 and 16 comprises an annular coupler 18, or torque-transmitting element, of almost ringlike configuration arranged coaxially within yoke 14 and encircling the yoke 16. The circumference of the coupler 18 is perforated at 90 degree intervals to receive rigidly, 180 degrees apart, a trunnion or pin 20, and each of the other two openings carries a standard cylindrical roller bearing 22, preferably, of the needle type. Implicit in the term "standard" is that special raceways or balls are not required and mass produced roller bearings may be utilized.

The yoke 14 is also provide with two inwardly facing apertures located 180 degrees apart adapted for receiving therein a roller bearing 22. The pins 20 of coupler 18 are inserted into the roller bearings 22 of yoke 14 to permit relative rotation between the members 14 and 18.

An elongated crossbar coupler 24 extends transversely within the annular coupler 18. The crossbar coupler is formed at each axial end with a trunnion pin 26 which are received, at their respective ends, in the roller bearings 22 of annular coupler 18 to rotatably mount the coupler 24 relative to coupler 18.

The axis of rotation between the couplers 18 and 24 is perpendicular relative to the axis of rotation between the coupler 18 and yoke 14 when the shafts 10 and 12 are coaxial.

Transverse to the axis of rotation between couplers 18 and 24, the crossbar coupler is provided with two additional trunnion pins 28 which are located near the axial center of the bar, one on each side thereof, protruding into apertures of the fork-like yoke 16. Each aperture carries a roller bearing 22 to rotatably support the pins 28 which are formed integral with the crossbar coupler 24.

As is shown in FIGURE 2, the pins 28 rotatably or pivotally connecting the coupler 24 to yoke 16, and the pins 20 rotatably (pivotally) connecting the yoke 14 to coupler 18, are coaxially aligned when the shafts are in coaxial relationship. Because the angle between the axis defined by pins 20 and 28 is always bisected by the homokinetic plane, the torque-transmitting elements 18 and 24 are always symmetric in relation to the homokinetic plane.

For constant velocity to be transmitted between the shafts 10 and 12, the axis of rotation defined by pins 26, see X—X (FIGURE 3), must lie in the homokinetic plane. This will be the case at all joint angles and rotational positions. However, when the axes defined by the axis of rotation of pins 28, see Y—Y (FIGURE 2), and pins 20, see Z—Z (FIGURE 2), coincide, as is illustrated in FIGURE 2, it is possible to rotate the intermediate assembly about the Y-Z axis, so that the axis of X—X would no longer be symmetric to the homokinetic plane, thereby locking the joint.

To prevent the intermediate assembly from being inadvertently rotated when the Z—Z and Y—Y axes coincide, a system of elastic restraints is employed. There is shown in FIGURES 2 and 3 two restraining elements 29 and 31 each composed of two divergently extending tension springs 30, one such element being connected to and between shaft 10 and coupler 24, and another being connected in a similar manner to and between shaft 12 and coupler 24. The adjacent ends of each set of springs are suitably anchored to shafts 10 and 12, respectively, while the opposite ends of each set are spaced apart and anchored to the coupler 24 each at one axial end thereof.

The restraining elements 29 and 31 oppose the rotation of the coupler 18 and 24 about the Y-Z axis when these axes coincide.

Figure 4:
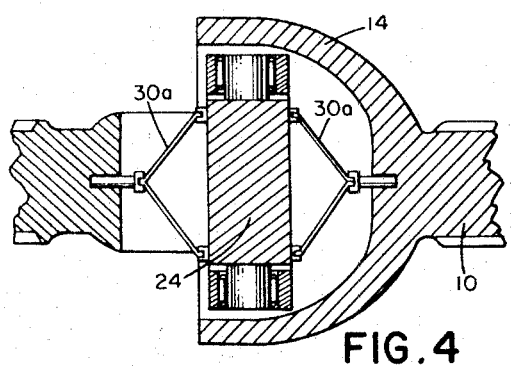
FIGURES 4 and 5 are views similar to FIGURE 3 showing modifications of the rotation restraining element.
Figure 5:
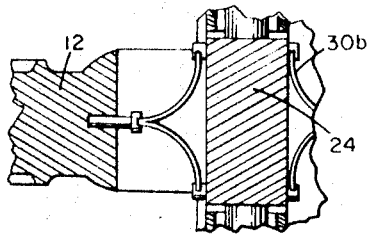

FIGURES 4 and 5 show a modification of the elastic restraining elements. In FIGURE 4 a strip-like member of elastomeric material, see 30a, is substituted for the spring 30. FIGURE 5 illustrates an elastic metal band as a substitute for the spring, see 30b. It is obvious that numerous forms or shapes may be employed for the elastic member 30 and the strip-like configuration is merely one example. In any case, however, the elastic element does not in any manner contribute to the torque transmission.

Figure 6:
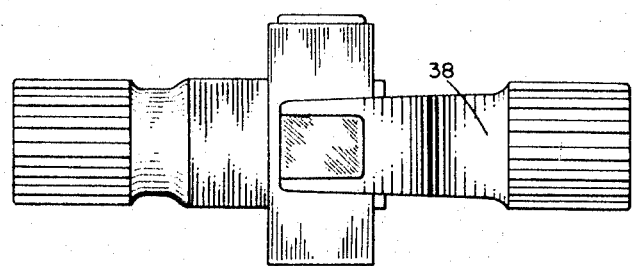
FIGURES 6 and 7 are top and side views, respectively, of a modified yoke member.
Figure 7:
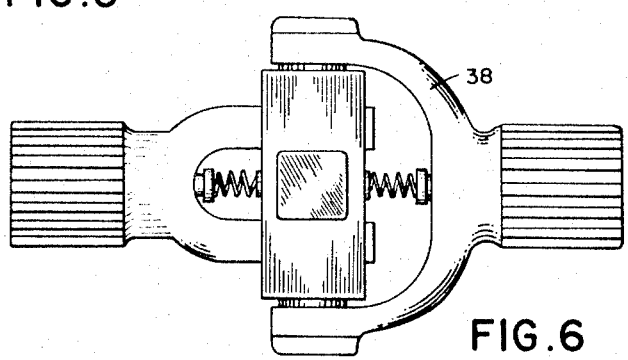

FIGURES 6 and 7 illustrate a further modification of the bell-shaped yoke 14, see FIGURE 1, in which the yoke 38 has a fork-like configuration.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What I claim is:

1. A constant velocity universal joint comprising, in combination: a driving member and a driven member, each of said members having at their adjacent ends a yoke; an annular coupler trunnioned to a yoke of one of said members and encircling the other yoke; an elongated bar coupler trunnioned to the said other yoke and arranged within and trunnioned to said annular coupler; said couplers being constructed and arranged in relation to the yoke of the driving and of the driven member so that the trunnions are maintained in symmetry with the homokinetic plane; and elastic rotation restraining means, one thereof secured to said driving member and another secured to said driven member, the adjacent ends of the two restraining means being secured to said bar coupler one at each side thereof.

2. A universal joint according to claim 1, and pins forming a trunnion on said annular coupler about 180 degrees apart and extending diametrically outward from said coupler and being connected to said first mentioned yoke for relative rotational movement therebetween.

3. A universal joint according to claim 2, and a pin forming a trunnion on each axial end of said bar coupler and extending outwardly therefrom and connected to said annular coupler for relative rotational movement therebetween; and a pin forming a trunnion extending transversely to the longitudinal axis of said bar proximate to the center of the bar, one on each side thereof, and connected to the said other yoke for relative rotational movement between said other yoke and bar coupler.

4. A universal joint according to claim 3, and a cylindrical roller bearing mounted coaxially about and between each of said pins and said yoke, said other yoke and said annular coupler, respectively.

5. A universal joint according to claim 4, wherein said roller bearing contains needle bearing elements.

6. A universal joint according to claim 1, wherein said elastic rotation restraining means is composed of two diverging portions, each thereof being anchored proximate to the axial end of said bar coupler.

7. A universal joint according to claim 1, wherein said restraining means is comprised of a tension spring.

8. A universal joint according to claim 1, wherein said restraining means is composed of a rubber-like material.

9. A universal joint according to claim 1, wherein said restraining means is composed of an elastic metal band.

References Cited

UNITED STATES PATENTS

| 1,935,926 | 11/1933 | Wolf | 64—21 |
| 1,968,925 | 8/1934 | Barish | 64—21 |
| 3,385,081 | 5/1968 | Wier | 64—21 |

FOREIGN PATENTS

| 991,346 | 5/1965 | Great Britain. |

HALL C. COE, Primary Examiner

U.S. Cl. X.R.

64—18